United States Patent
Tanimoto (10) Patent No.: US 11,475,377 B2
(45) Date of Patent: Oct. 18, 2022

(54) MAINTENANCE RANGE OPTIMIZATION APPARATUS, MAINTENANCE RANGE OPTIMIZATION METHOD, AND COMPUTER-READABLE RECORDING MEDIUM

(71) Applicant: NEC CORPORATION, Tokyo (JP)

(72) Inventor: Akira Tanimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 16/645,228

(22) PCT Filed: Sep. 7, 2018

(86) PCT No.: PCT/JP2018/033298
§ 371 (c)(1),
(2) Date: Mar. 6, 2020

(87) PCT Pub. No.: WO2019/050014
PCT Pub. Date: Mar. 14, 2019

(65) Prior Publication Data
US 2020/0302347 A1 Sep. 24, 2020

Related U.S. Application Data

(60) Provisional application No. 62/555,776, filed on Sep. 8, 2017.

(51) Int. Cl.
*G06Q 10/04* (2012.01)
*G06N 20/00* (2019.01)
*G06Q 50/26* (2012.01)

(52) U.S. Cl.
CPC ............ *G06Q 10/04* (2013.01); *G06N 20/00* (2019.01); *G06Q 50/26* (2013.01)

(58) Field of Classification Search
None
See application file for complete search history.

(56) References Cited

U.S. PATENT DOCUMENTS

| | | | |
|---|---|---|---|
| 9,298,172 B2 * | 3/2016 | Tesauro | G06N 5/02 |
| 2014/0200872 A1 * | 7/2014 | Fang | G06Q 10/0635 |
| | | | 703/8 |

(Continued)

FOREIGN PATENT DOCUMENTS

| JP | 2014206795 A | * 10/2014 |
|---|---|---|
| JP | 2016-089593 A | 5/2016 |
| JP | 2017-099227 A | 6/2017 |

OTHER PUBLICATIONS

Habib et al. , Reinforcement learning based autonomic virtual machine management in clouds, 2016 5th International Conference on Informatics, Electronics and Vision (ICIEV) (pp. 1083-1088), May 2016 (Year: 2016).*

(Continued)

*Primary Examiner* — Crystol Stewart
*Assistant Examiner* — Chesiree A Walton (57) ABSTRACT

A maintenance range optimization apparatus 10 optimizes a range of maintenance on an object that requires maintenance at a plurality of places. The maintenance range optimization apparatus 10 includes a learning processing unit 20 that executes machine learning, using, as learning data, information from when maintenance was previously executed, including a pre-maintenance state, a maintenance cost and a movement cost of a place subjected to maintenance, and constructs a model indicating a relationship between the range of maintenance and an overall cost incurred in maintenance, and a maintenance range setting unit 30 that sets the range of maintenance using the model.

3 Claims, 5 Drawing Sheets

(56) References Cited

U.S. PATENT DOCUMENTS

2017/0063276 A1\* 3/2017 Zhi ..................... G01R 31/343
2017/0083822 A1\* 3/2017 Adendorff .............. G07C 5/006

OTHER PUBLICATIONS

Jacob et al., Highway Work Zone Dynamic Traffic Control Using Machine Learning Publisher: IEEE, Sep. 2006 (Year: 2006).\*
P. Panciatici et al., "Advanced optimization methods for power systems," 2014 Power Systems Computation Conference, 2014, pp. 1-18 (Year: 2014).\*
Miwa Masashi, "Establishment of track state evaluation model for optimizing long-term planning of track maintenance", 2012 fall research conference of the Operations Research Society of Japan, Sep. 12, 2012, pp. 16-17.
International Search Report for PCT/JP2018/033298 dated Dec. 11, 2018 [PCT/ISA/210].
Written Opinion for PCT/JP2018/033298 dated Dec. 11, 2018 [PCT/ISA/237].
Written Opinion of the International Searching Authority dated Dec. 11, 2018, in International Application No. PCT/JP2018/033298.

\* cited by examiner

MAINTENANCE RANGE OPTIMIZATION APPARATUS, MAINTENANCE RANGE OPTIMIZATION METHOD, AND COMPUTER-READABLE RECORDING MEDIUM

CROSS REFERENCE TO RELATED APPLICATIONS

This application is a National Stage of International Application No. PCT/JP2018/033298 filed Sep. 7, 2018, claiming priority based on U.S. Patent Application No. 62/555,776 filed Sep. 8, 2017.

TECHNICAL FIELD

The present invention relates to a maintenance range optimization apparatus and a maintenance range optimization method that are for executing optimization of a range of maintenance on an object that requires maintenance at a plurality of places, and relates to a computer-readable recording medium that includes a program recorded thereon for realizing the apparatus and method.

BACKGROUND ART

There are cases where maintenance is performed on a plurality of geographically dispersed objects. For example, roads suffer damage such as potholes and cracks due to vehicle usage and deterioration over time, with such damage occurring at various dispersed places along the road. In such cases, maintenance is required on damage that occurs at geographically dispersed places.

In the case where, however, the object has a long overall length and many routes such as a road, it is physically impossible to perform maintenance on all the damage at one time. Thus, heretofore, with roads, priorities are set for the different routes, and a maintenance implementation plan is formulated.

For example, Patent Document 1 proposes a system that sets a priority of maintenance for each respective route constituting a road. The system disclosed in Patent Document 1, first, acquires attribute information indicating attributes of the road, state information indicating the state of the road, and input information that is input from outside. Of these, the attribute information includes road width, extension, position, paving period, use application, use frequency, and the like. The state information is information indicating the state of paving of the road, and includes the percentage of cracking, the state of ruts, smoothness, and the like. The input information is information released in relation to the road, and includes complaints and requests made through a liaison, for example.

Next, the system disclosed in Patent Document 1 calculates a priority of maintenance for each route, using the acquired information. Specifically, the system disclosed in Patent Document 1 calculates a priority for every route with consideration for safety, use frequency, use application, locality, traffic, importance, and the like. As a result, according to the system disclosed in Patent Document 1, maintenance is performed in order starting with the routes that need maintenance immediately.

LIST OF RELATED ART DOCUMENTS

Patent Document

Patent Document 1: Japanese Patent Laid-Open Publication No. 2016-89593A

SUMMARY OF INVENTION

Problems to be Solved by the Invention

Incidentally, in the case where the maintenance places are geographically dispersed such as with a road, cost is incurred in moving between the maintenance places. Accordingly, in the case where another place that needs maintenance but is not next in the priority order exists close to a place that is high in the priority order for maintenance, that place should also undergo maintenance together with the high priority place in terms of movement cost.

However, the system disclosed in Patent Document 1 is merely configured to set a priority order for every route, and optimization of the range for implementing maintenance is not performed, thus resulting in the problem of increased overall cost incurred in maintenance.

An example object of the invention is to provide a maintenance range optimization apparatus, a maintenance range optimization method and a computer-readable recording medium that can optimize the range of maintenance, while suppressing an increase in cost, in the case of performing maintenance on a plurality of geographically dispersed places.

Means for Solving the Problems

A maintenance range optimization apparatus according to an example aspect of the invention is for optimizing a range of maintenance on an object that requires maintenance at a plurality of places, the apparatus including:

a learning processing unit configured to execute machine learning, using, as learning data, information from when maintenance was previously executed, including a pre-maintenance state, a maintenance cost and a movement cost of a place subjected to maintenance, and construct a model indicating a relationship between the range of maintenance and an overall cost incurred in maintenance; and a maintenance range setting unit configured to set the range of maintenance using the model.

Also, a maintenance range optimization method according to an example aspect of the invention is for optimizing a range of maintenance on an object that requires maintenance at a plurality of places, the method including:

(a) a step of executing machine learning, using, as learning data, information from when maintenance was previously executed, including a pre-maintenance state, a maintenance cost and a movement cost of a place subjected to maintenance, and constructing a model indicating a relationship between the range of maintenance and an overall cost incurred in maintenance; and (b) a step of setting the range of maintenance using the model.

Furthermore, a computer-readable recording medium according to an example aspect of the invention includes a program recorded thereon for optimizing, by computer, a range of maintenance on an object that requires maintenance at a plurality of places, the program including instructions that cause the computer to carry out:

(a) a step of executing machine learning, using, as learning data, information from when maintenance was previously executed, including a pre-maintenance state, a maintenance cost and a movement cost of a place subjected to maintenance, and constructing a model indicating a relationship between the range of maintenance and an overall cost incurred in maintenance; and (b) a step of setting the range of maintenance using the model.

Advantageous Effects of the Invention

As described above, according to the invention, the range of maintenance can be optimized, while suppressing an increase in cost, in the case of performing maintenance on a plurality of geographically dispersed places.

EXAMPLE EMBODIMENTS

Example Embodiment

Hereinafter, a maintenance range optimization apparatus, a maintenance range optimization method and a program according to an example embodiment of the invention will be described, with reference to FIGS. 1 to 4.

[Apparatus Configuration]

Figure 1:
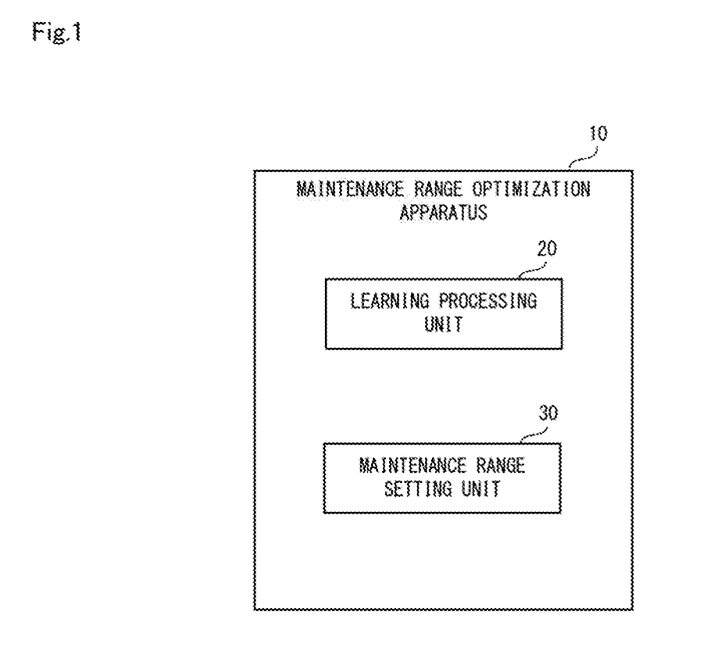
FIG. 1 is a block diagram showing a schematic configuration of a maintenance range optimization apparatus according to an example embodiment of the invention.

Initially, a configuration of the maintenance range optimization apparatus according to the example embodiment will be described, using FIG. 1. FIG. 1 is a block diagram showing a schematic configuration of the maintenance range optimization apparatus according to the example embodiment of the invention.

A maintenance range optimization apparatus 10 according to the example embodiment shown in FIG. 1 is an apparatus for optimizing the range of maintenance for an object that requires maintenance at a plurality of places. As shown in FIG. 1, the maintenance range optimization apparatus 10 is provided with a learning processing unit 20 and a maintenance range setting unit 30.

Of these, the learning processing unit 20 executes machine learning for learning, as learning data, information from when maintenance was previously executed, including a pre-maintenance state, a maintenance cost and a movement cost of a place subjected to maintenance. The learning processing unit 20 then constructs a model showing the relationship between the range of maintenance and the overall cost related to maintenance from the results of machine learning. The maintenance range setting unit 30 sets the range of maintenance using the model that is constructed.

In this way, the maintenance range optimization apparatus 10 is able to learn the relationship between the range and cost of maintenance from past data, in the case where the object for maintenance requires maintenance at a plurality of geographically dispersed places. Thus, according to the maintenance range optimization apparatus 10, the range of maintenance can be optimized, while suppressing an increase in cost, in the case of performing maintenance on a plurality of geographically dispersed places.

Figure 2:
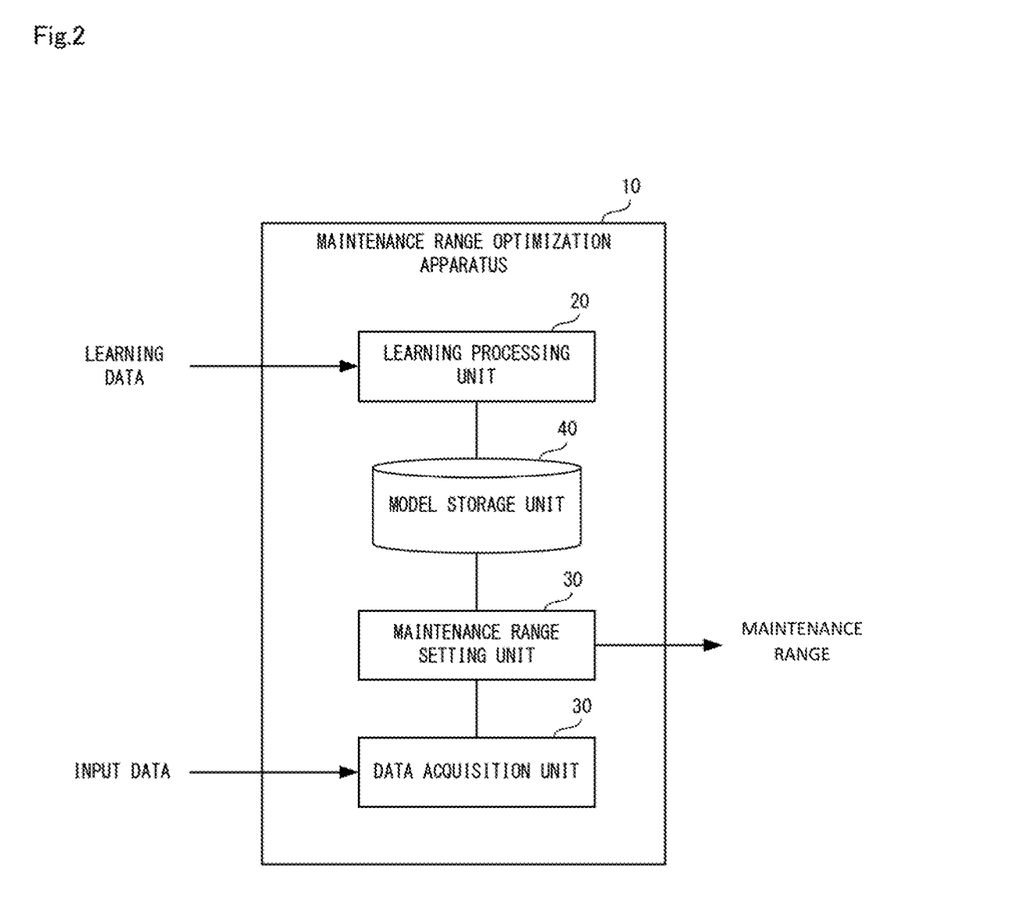
FIG. 2 is a block diagram specifically showing a configuration of the maintenance range optimization apparatus according to the example embodiment of the invention.

Next, the configuration and functions of the maintenance range optimization apparatus 10 according to the example embodiment will be described more specifically, using FIG. 2. FIG. 2 is a block diagram specifically showing a configuration of the maintenance range optimization apparatus according to the example embodiment of the invention.

In the example embodiment, the object of maintenance range optimization is not particularly limited as long as repairs are required at a plurality of places. A road, a water pipe, and an ATM network constructed from a plurality of ATMs (Automatic Teller Machines) are given as examples of specific objects. In the following, the case where the object of maintenance range optimization is a road will be described.

Also, in the example embodiment, as shown in FIG. 2, the maintenance range optimization apparatus 10 is further provided with a model storage unit 40 and a data acquisition unit 50, in addition to the abovementioned learning processing unit 20 and maintenance range setting unit 30.

The learning processing unit 20 executes machine learning using learning data and constructs a model as described above, and stores the constructed model in the model storage unit 40. Also, first, data specifying a pre-maintenance state of a place subjected to maintenance, such as data indicating the degree of unevenness of a place subjected to maintenance, for example, is given as an example of learning data. Such data indicating the degree of unevenness can be obtained by, for example, driving a vehicle provided with a laser range finder that measures the distance to the road surface.

Furthermore, data specifying the cost incurred in maintenance, data specifying the cost incurred in movement of a maintenance contractor and the like are also given as examples of learning data. Also, these types of learning data are prepared for every section set on the road in advance. Note that, hereinafter, the number of sections is given as "I".

Also, the learning processing unit 20, in the example embodiment, executes Q-learning as machine learning, and constructs a Q function as a model. This will be specifically described hereinafter.

First, the following equation 1 holds true, where $s_t$ is the state of the road in a given section. t indicates elapsed time from a reference time.

$$s_t \in R_+^I \qquad \text{[Equation 1]}$$

Also, a vector indicating, for each section, whether maintenance is to be performed thereon is given as $a_t$. $a_t$ is an I dimensional vector. In this case, $a_t$ can be represented by the following equation 2. Also, in the following equation 2, $\text{Cost}(s_t, a_t)$ is a Q function that is constructed by learning. β is a variable that discounts a future indefinite factor, and is represented by following equation 3.

$$a_t = \underset{a \in \Gamma(t) \subset \{0,1\}^I}{\operatorname{argmin}} \left\{ \operatorname{Cost}(s_t, a_t) + \underset{\{a_{t'}\}_{(t+1)}^{H}}{\min} E\left[ \sum_{t'=t+1}^{H} \beta^{t'-t} \operatorname{Cost}(s_{t'}(s_t, a_{t:t'-1}), a_{t'}) \right] \right\}$$ [Equation 2]

$$\beta \in [0, 1]$$ [Equation 3]

In this case, the learning processing unit 20 acquires data D shown in the following equation 4 as learning data. Also, in the following equation 4, $s_t$ and $s_{t+1}$ are represented by the following equation 5, and $a_t$ is represented by the following equation 6.

$$\text{Input:} D = \{s_t, a_t, r_t(s_t, a_t), s_{t+1}\}_t, \alpha, \beta, l_m, l_d$$ [Equation 4]

$$s_t, s_{t+1} \in R^I$$ [Equation 5]

$$a_t \in \{0,1\}^I$$ [Equation 6]

Furthermore, in the following equation 4, α indicates a threshold at which a cost or risk assessment value resulting from the poorness of the state arises. Also, $l_m$ shows the cost incurred in maintenance and $l_d$ shows the cost incurred in movement of the maintenance contractor.

Also, in the above equation 4, $r_t(s_t, a_t)$ represents the total cost obtained by totaling the cost incurred in maintenance and the cost or risk assessment value resulting from the poorness of the state, and is represented by the following equation 7.

$$r_t(s_t, a_t) = l_r(s_t) + l_c(a_t) \in R^I$$ [Equation 7]

In addition, in the above equation 7, $l_r(s_t)$ indicates the cost that arises in a state $s_t$, as shown in equation 8. Also, $l_c(a_t)$ indicates the cost in cases where maintenance $a_t$ is performed, as shown in equation 9.

$$l_r(s_t) = \Sigma_i (s_i - \alpha)_+$$ [Equation 8]

$$l_c(a_t) = \Sigma_i a_i \{l_m + (1 - a_{i-1}) l_d\}$$ [Equation 9]

The learning processing unit 20 then executes Q-learning with the data D shown in the above equation 4 as learning data, and constructs a function $Q_\theta (= \operatorname{Cost}(s_t, a_t))$ shown in the following equation 10 as a Q function.

$$Q_\theta(s, a) = l_c(a) + \Sigma_i q_i(s_i, a_i)$$ [Equation 10]

Also, in the above equation 10, $q_i$ indicates the poorness of the state of a section i prior to a present time t, and is represented by the following equation 11.

$$q_i(s_t, a_i) = a_i \frac{\theta_3}{\theta_1} \log(1 + e^{-\theta_1 * (s_i - \theta_2)}) + (1 - a_i) e^{\theta_4}$$ [Equation 11]

Note that, in above equation 10, θ is a parameter that is learned and indicates a value obtained from $\theta_1$ to $\theta_4$. Also, $\theta_1$ indicates the gradualness with which the maintenance priority increases, $\theta_2$ indicates a threshold for increasing the maintenance priority, $\theta_3$ indicates a limit when $s_i$ of an increment in the maintenance priority relative to $s_i$ is large, and $\theta_4$ indicates an average logarithm of the value of not performing maintenance.

Furthermore, the learning processing unit 20 updates the function $Q_\theta$, using the following equations 12 to 15, when new data D is acquired as learning data. Note that, in the following equation 15, k indicates an index of the number of iterations.

$$\text{Let } y = l_r(s_t) + \beta \max_{a'} Q_\theta(s_{t+1}, a')$$ [Equation 12]

$$\text{Let } L_\theta = \frac{1}{2}(y - Q_\theta(s_t, a_t))^2$$ [Equation 13]

$$\text{update } \theta \text{ with } \theta - \gamma_t \frac{dL_\theta}{d\theta}$$ [Equation 14]

$$\text{Learning rate } \gamma_t = (1 + k)^{-0.5}$$ [Equation 15]

The data acquisition unit 50 acquires input data regarding the object for maintenance range optimization, and inputs the acquired input data to the maintenance range setting unit 30. Data indicating the state s of the road for each section of a road set in advance is given as an example of input data in this case.

The maintenance range setting unit 30, in the example embodiment, first, inputs the input data acquired by the data acquisition unit 50 to a model that is stored in the model storage unit 40, and sets the range of maintenance, such that the value that is obtained is maximized. Specifically, the maintenance range setting unit 30 specifies a vector a that maximizes the value of the function $Q_\theta$, when the input data and the vector a are input to the function $Q_\theta$ shown in the above equation 9, and outputs the specified vector a as the maintenance range.

[Apparatus Operations]

Next, operations of the maintenance range optimization apparatus 10 according to the example embodiment of the invention will be described using FIGS. 3 and 4. In the following description, FIGS. 1 and 2 are taken into consideration as appropriate. Also, in the example embodiment, a maintenance range optimization method is implemented by operating the maintenance range optimization apparatus 10. Therefore, the following description of the operations of the maintenance range optimization apparatus 10 is given in place of a description of the maintenance range optimization method according to the example embodiment.

Initially, learning processing by the maintenance range optimization apparatus 10 will be described, using FIG. 3. FIG. 3 is a flowchart showing the operations of learning processing by the maintenance range optimization apparatus according to the example embodiment of the invention.

Figure 3:
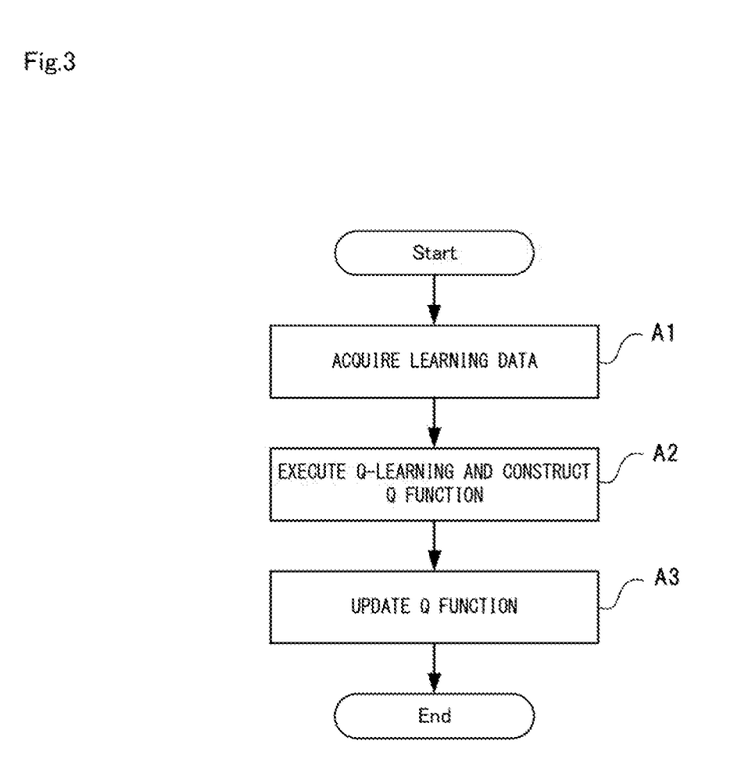
FIG. 3 is a flowchart showing operations of learning processing by the maintenance range optimization apparatus according to the example embodiment of the invention.

As shown in FIG. 3, initially, the learning processing unit 20 acquires learning data (step A1). Specifically, the learning processing unit 20 acquires, as learning data, data indicating the degree of unevenness of a place subjected to maintenance, data specifying the cost incurred in maintenance, data specifying the cost incurred in movement of the maintenance contractor, and the like.

Next, the learning processing unit 20 executes Q-learning, using the data acquired in step A1, and constructs a Q function (step A2). Also, the learning processing unit 20 stores the constructed Q function in the model storage unit 40.

Next, the learning processing unit 20, in the case where there is data acquired in step A1 that has not been utilized in step A2, updates the Q function constructed in step A2, using this data that has not been utilized (step A3). Step A3 is repeatedly executed until there is no longer any data that has not been utilized. The learning processing ends as a result of the end of step A3.

Next, processing for optimizing the maintenance range by the maintenance range optimization apparatus 10 will be described, using FIG. 4. FIG. 4 is a flowchart showing the operations of maintenance range optimization processing by the maintenance range optimization apparatus according to the example embodiment of the invention.

Figure 4:
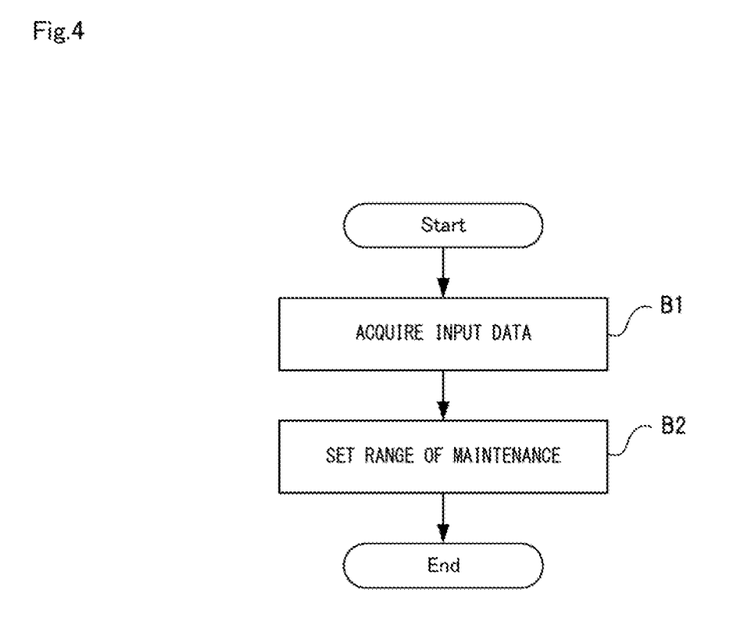
FIG. 4 is a flowchart showing operations of maintenance range optimization processing by the maintenance range optimization apparatus according to the example embodiment of the invention.

As shown in FIG. 4, initially, the data acquisition unit 50 acquires input data regarding the object for maintenance range optimization (Step B1). Specifically, the data acquisition unit 50 acquires, as input data, data indicating the state s of the road for each section of a road set in advance.

Next, the maintenance range setting unit 30, in the example embodiment, initially, inputs the input data acquired by the data acquisition unit 50 to the model that is stored in the model storage unit 40, and sets the range of maintenance, such that the value that is obtained is maximized (step B2).

Specifically, in step B2, the maintenance range setting unit 30 sets an arbitrary vector a, inputs the set vector a and the input data to the function $Q_\theta$ shown in the above equation 9, and obtains an output value. Also, the maintenance range setting unit 30 repeatedly sets an arbitrary vector a and acquires an output value, and specifies a vector a that maximizes the value of the function $Q_\theta$. The maintenance range setting unit 30 then outputs the specified vector a as the maintenance range.

Through execution of step B2, an optimal range of maintenance for the current state of the road will be obtained, in the example embodiment.

Effects of Embodiment

In the example embodiment, as described above, in the case where the object of maintenance is a road and the places that need to undergo maintenance are geographically dispersed, the relationship between the range and cost of maintenance is learned by Q-learning from data obtained at the time of past road maintenance. Accordingly, with the example embodiment, the range of maintenance can be optimized, while suppressing an increase in cost, in the case of performing maintenance on a plurality of geographically dispersed places on a road.

In the abovementioned example, the case where the object of maintenance range optimization is a road was described, but the example embodiment can also be applied to a water pipe, an ATM network and the like, apart from a road. Also, in the case where the object is a water pipe, data indicating an internal state of the water pipe, for example, is used as data specifying a pre-maintenance state of a place subjected to maintenance. Furthermore, in the case where the object is an ATM network, data specifying the amount of notes in each ATM, for example, is used as data specifying a pre-maintenance state of a place subjected to maintenance.

[Program]

A program according to the example embodiment need only be a program that causes a computer to execute steps A1 to A3 shown in FIG. 3 and steps B1 and B2 shown in FIG. 4. The maintenance range optimization apparatus 10 and the maintenance range optimization method according to the example embodiment can be realized, by this program being installed on a computer and executed. In this case, a processor of the computer performs processing, while functioning as the learning processing unit 20, the maintenance range setting unit 30, and the data acquisition unit 50.

Also, programs according to the example embodiment may be executed by a computer system constructed from a plurality of computers. In this case, for example, the computers may respectively function as one of the learning processing unit 20, the maintenance range setting unit 30, and the data acquisition unit 50.

Figure 5:
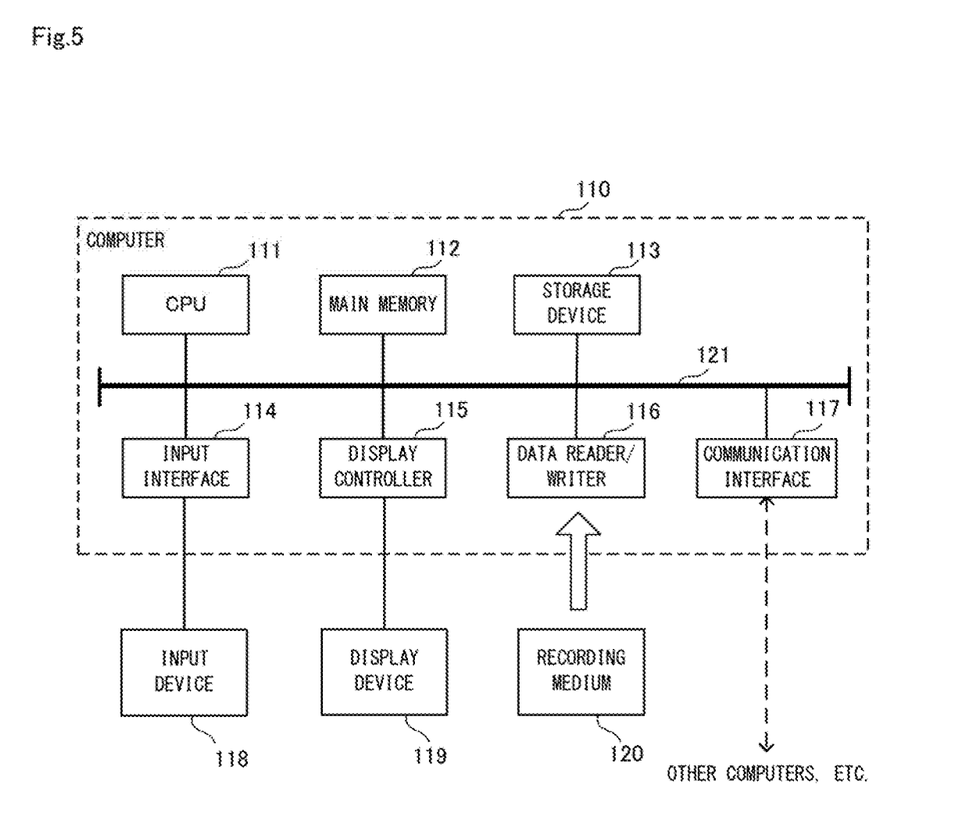
FIG. 5 is a block diagram showing an example of a computer that realizes the maintenance range optimization apparatus according to the example embodiment of the invention.

Here, a computer that realizes the maintenance range optimization apparatus 10 by executing a program according to the example embodiment will be described using FIG. 5. FIG. 5 is a block diagram showing an example of a computer that realizes the maintenance range optimization apparatus according to the example embodiment of the invention.

As shown in FIG. 5, a computer 110 is provided with a CPU (Central Processing Unit) 111, a main memory 112, a storage device 113, an input interface 114, a display controller 115, a data reader/writer 116, and a communication interface 117. These units are connected to each other in a data communicable manner, via a bus 121. Note that the computer 110 may be provided with a GPU (Graphics Processing Unit) or a FPGA (Field-Programmable Gate Array), in addition to the CPU 111 or instead of the CPU 111.

The CPU 111 implements various computational operations, by expanding program (codes) according to the example embodiment stored in the storage device 113 in the main memory 112, and executing these codes in predetermined order. The main memory 112, typically, is a volatile storage device such as a DRAM (Dynamic Random Access Memory). Also, programs according to the example embodiment are provided in a state of being stored on a computer-readable recording medium 120. Note that programs according to the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to the display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory) are given as specific examples of the recording medium 120.

Note that the maintenance range optimization apparatus 10 according to the example embodiment is also realizable by using hardware corresponding to the respective units, rather than by a computer on which programs are installed. Furthermore, the maintenance range optimization apparatus 10 may be realized in part by programs, and the remainder may be realized by hardware.

The example embodiment described above can be partially or wholly realized by supplementary notes 1 to 6 described below, but the invention is not limited to the following description.

(Supplementary Note 1)

A maintenance range optimization apparatus for optimizing a range of maintenance on an object that requires maintenance at a plurality of places, the apparatus including:

a learning processing unit configured to execute machine learning, using, as learning data, information from when maintenance was previously executed, including a pre-maintenance state, a maintenance cost and a movement cost of a place subjected to maintenance, and construct a model indicating a relationship between the range of maintenance and an overall cost incurred in maintenance; and a maintenance range setting unit configured to set the range of maintenance using the model.

(Supplementary Note 2)

The maintenance range optimization apparatus according to supplementary note 1, in which the learning processing unit executes Q-learning as the machine learning, and constructs a Q function as the model, and the maintenance range setting unit sets the range of maintenance such that a value of the Q function is maximized.

(Supplementary Note 3)

A maintenance range optimization method for optimizing a range of maintenance on an object that requires maintenance at a plurality of places, the method including:

(a) a step of executing machine learning, using, as learning data, information from when maintenance was previously executed, including a pre-maintenance state, a maintenance cost and a movement cost of a place subjected to maintenance, and constructing a model indicating a relationship between the range of maintenance and an overall cost incurred in maintenance; and (b) a step of setting the range of maintenance using the model.

(Supplementary Note 4)

The maintenance range optimization method according to supplementary note 3, in which, in the (a) step, Q-learning is executed as the machine learning, and a Q function is constructed as the model, and in the (b) step, the range of maintenance is set such that a value of the Q function is maximized.

(Supplementary Note 5)

A computer-readable recording medium that includes a program recorded thereon for optimizing, by computer, a range of maintenance on an object that requires maintenance at a plurality of places, the program including instructions that cause the computer to carry out:

(a) a step of executing machine learning, using, as learning data, information from when maintenance was previously executed, including a pre-maintenance state, a maintenance cost and a movement cost of a place subjected to maintenance, and constructing a model indicating a relationship between the range of maintenance and an overall cost incurred in maintenance; and (b) a step of setting the range of maintenance using the model.

(Supplementary Note 6)

The recording medium according supplementary note 5, in which, in the (a) step, Q-learning is executed as the machine learning, and a Q function is constructed as the model, and in the (b) step, the range of maintenance is set such that a value of the Q function is maximized.

Although the invention of the present application has been described above with reference to example embodiments, the invention is not limited to the example embodiments described above. Various modifications apparent to those skilled in the art can be made to the configuration and details of the intention within the scope of the invention.

This application is based on and claims the benefit of priority from U.S. Application No. 62/555,776 filed on Sep. 8, 2017, the disclosure of which is incorporated herein in its entirety by reference.

INDUSTRIAL APPLICABILITY

According to the invention, the range of maintenance can be optimized, while suppressing an increase in cost, in the case of performing maintenance on a plurality of geographically dispersed places. The invention is useful for roads, water pipes, ATM networks and the like that require maintenance at a plurality of places.

LIST OF REFERENCE SIGNS

10 Maintenance range optimization apparatus
20 Learning processing unit
30 Maintenance range setting unit
40 Model storage unit
50 Data acquisition unit
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A maintenance range optimization apparatus for optimizing a range of maintenance on an object that requires the maintenance at a plurality of places, the apparatus comprising:

a processor; and a memory storing program code executable by the processor to:

execute machine learning, using, as learning data, information from when the maintenance was previously executed, including a pre-maintenance state, a maintenance cost and a movement cost of each place subjected to the maintenance, to construct a machine learning model indicating a relationship between the range of the maintenance and an overall end cost including a risk resulting from deteriorated objects incurred in the maintenance; and set the range of the maintenance as a vector indicating whether each place has been maintained or not, using the model, wherein when the machine learning model is constructed, Q-learning as the machine learning is executed that employs a Q function as the machine learning model is constructed, where data specifying the pre-maintenance state of each place is input into the Q function, where the Q function into which the data is input is applied to the vector, and where the Q function is expressed as a decomposition of a current maintenance cost and a maintenance benefit at each place, and the range of the maintenance is set as the vector at which the value of the Q function is maximized.

2. A maintenance range optimization method for optimizing a range of maintenance on an object that requires the maintenance at a plurality of places, the method comprising:

executing machine learning, using, as learning data, information from when the maintenance was previously executed, including a pre-maintenance state, a maintenance cost and a movement cost of each place subjected to the maintenance, to constructing a machine learning model indicating a relationship between the range of the maintenance and an overall end cost including a risk resulting from deteriorated objects incurred in the maintenance; and setting the range of the maintenance as a vector indicating whether each place has been maintained or not, using the machine learning model, wherein when the machine learning model is constructed, Q-learning as the machine learning is executed that employs a Q function as the machine learning model is constructed, where data specifying the pre-maintenance state of each place is input into the Q function, where the Q function into which the data is input is applied to the vector, and where the Q function is expressed as a decomposition of a current maintenance cost and a maintenance benefit at each place, and the range of the maintenance is set as the vector at which the value of the Q function is maximized.

3. A non-transitory computer-readable recording medium that includes a program recorded thereon for optimizing, by computer, a range of maintenance on an object that requires the maintenance at a plurality of places, the program including instructions that cause the computer to carry out:

executing machine learning, using, as learning data, information from when the maintenance was previously executed, including a pre-maintenance state, a maintenance cost and a movement cost of each place subjected to the maintenance, to constructing a machine learning model indicating a relationship between the range of the maintenance and an overall end cost including a risk resulting from deteriorated objects incurred in the maintenance; and setting the range of the maintenance as a vector indicating whether each place has been maintained or not, using the machine learning model, wherein when the machine learning model is constructed, Q-learning as the machine learning is executed that employs a Q function as the machine learning model is constructed, where data specifying the pre-maintenance state of each place is input into the Q function, where the Q function into which the data is input is applied to the vector, and where the Q function is expressed as a decomposition of a current maintenance cost and a maintenance benefit at each place, and the range of the maintenance is set as the vector at which the value of the Q function is maximized.

* * * * *